Jan. 27, 1931.    R. O. GILBURG    1,790,301
FEEDING MEANS FOR PUNCH PRESSES
Filed Dec. 20, 1928    2 Sheets-Sheet 1
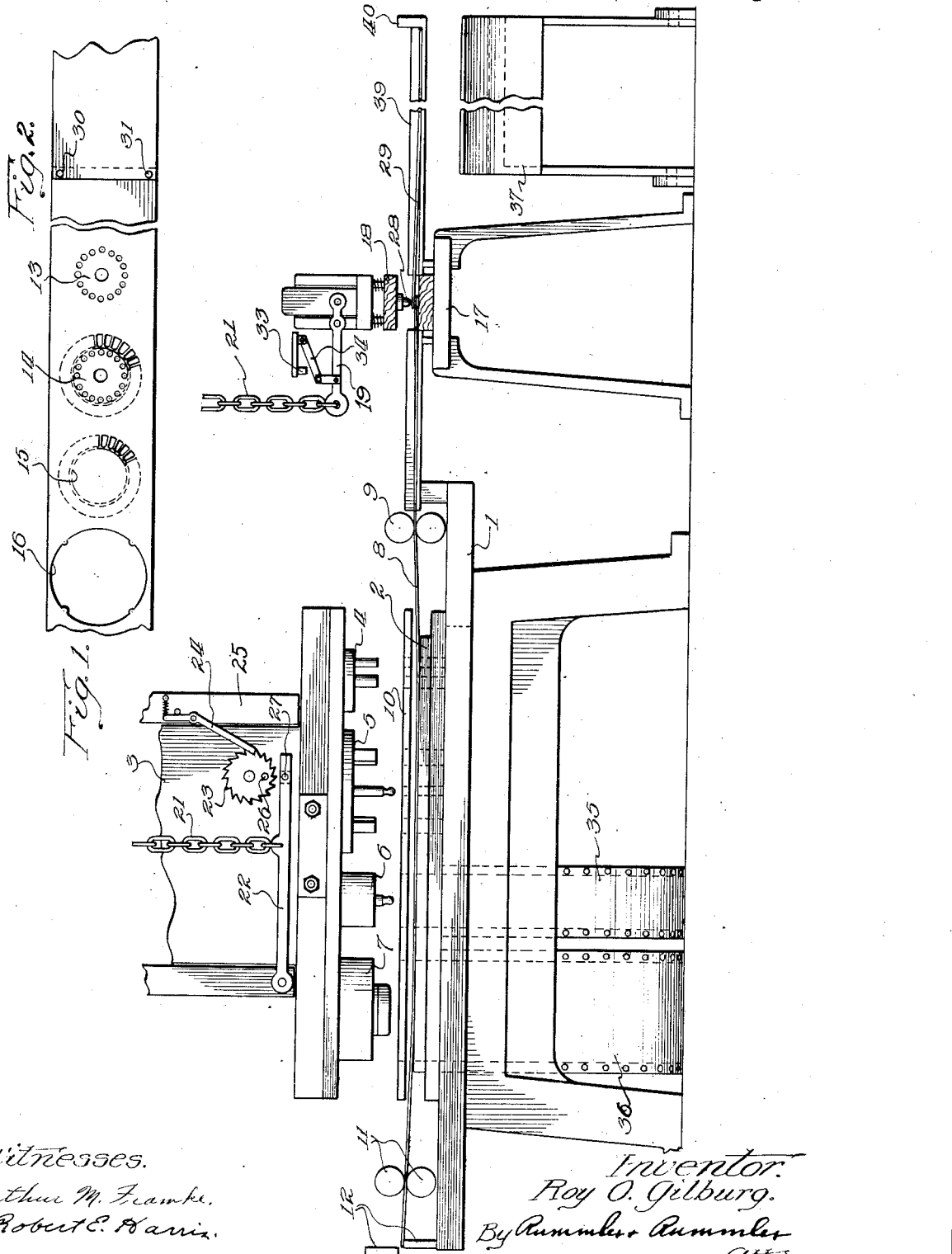
Witnesses.
Arthur M. Franke.
Robert E. Harris.
Inventor.
Roy O. Gilburg.
By Rummler & Rummler
Attys.

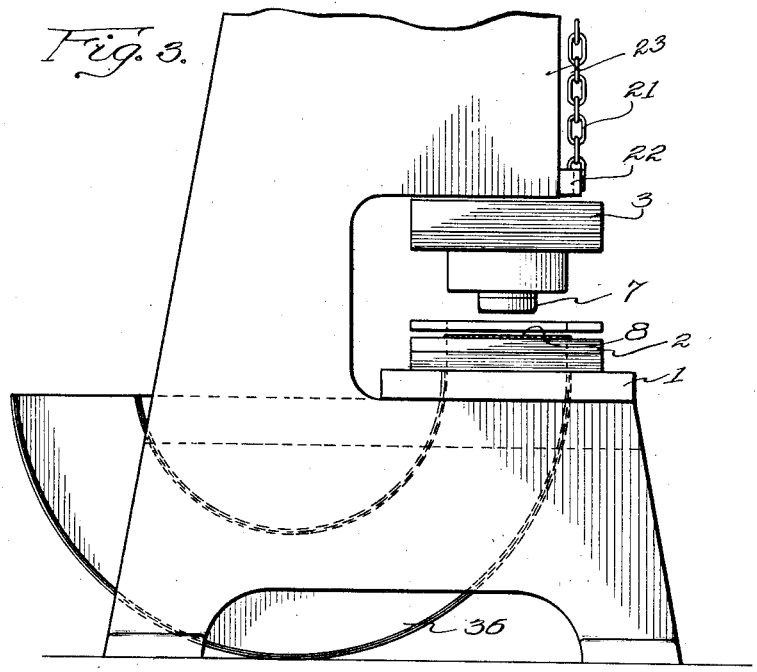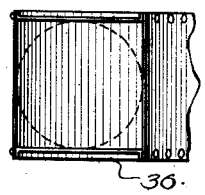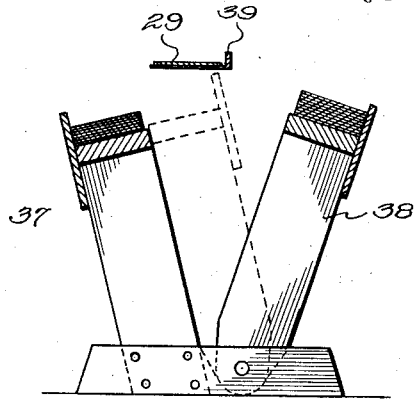

Patented Jan. 27, 1931

1,790,301

UNITED STATES PATENT OFFICE

ROY O. GILBURG, OF WAUSAU, WISCONSIN, ASSIGNOR TO MARATHON ELECTRIC MFG. CO., OF WAUSAU, WISCONSIN, A CORPORATION OF WISCONSIN

FEEDING MEANS FOR PUNCH PRESSES

Application filed December 20, 1928. Serial No. 327,280.

This invention relates to an improved stamping machine and progressive method for feeding stock thereto. The particular example herein described is designed for producing rotor and stator laminations for electrical motors.

The main objects of this invention are to provide in a stamping machine for simultaneously making a plurality of different spaced die stampings on a strip of stock in a single operation, means for rigidly attaching separate strips of stock together in a fixed relation to preceding strips for facilitating continuous feeding of the stock; and to provide for correcting the position of the stock each time a new strip is fed to the machine; to provide an operative driving connection between a stamping press and a welding unit for automatically welding strips of stock together after progressing through a predetermined number of operations; and to provide means for operatively stacking stampings of like kinds after they are punched out of the stock.

A further object of this invention is to provide means for retaining a supply of stock in a convenient position and for facilitating the replenishment of this supply and continuous operation of the machine.

The stock from which motor, stator and rotor laminations are punched is not available in rolls but only in strips or sheets, for example 8 foot lengths. Heretofore in feeding such short strips to progressive stamping operations, it has been necessary to interrupt the operation of the machinery employed each time a new strip of stock is fed thereto, in order to properly position the same relative to the preceding strip and to the die. Each newly fed strip has to be positioned relative to the dies so as to allow a substantial margin between successive stampings, thereby causing waste of stock, and loss of time.

In many instances these disadvantages become so material and perplexing as to require the performance of each separate stamping operation by a different operator, thus increasing the expense of production enormously.

In the present invention four different and spaced die stampings are made each time a ram carrying four dies is moved downwardly. The stock in the form of a strip is fed to the dies by feed rollers, which advance the strip sufficiently each time the ram completes a cycle to position the portions stamped by one die in registration with the next successive die.

A spot welding device comprising a supporting structure for the strip of stock being stamped and a gauge for supporting and suitably positioning another strip of stock to be stamped subsequently, is located at the feeding end of the stamping press. The stamping machine is operatively connected with a spot welding device. By the time a predetermined number of strokes have been completed and the first strip of stock has been moved by the rollers until its rear end is under the welding elements, the welding elements move downwardly into engagement with the overlapping ends of the two strips of stock, and rigidly secure the same together.

In the accompanying drawings, I have illustrated a specific embodiment of my invention, in which:

Fig. 1 is a front elevation of a stamping machine and an operatively connected welding device.

Fig. 2 is a fragmentary detail of a blank from which stampings have been made showing a strip of stock welded thereto.

Fig. 3 is a fragmentary end elevation of a stamping machine.

Fig. 4 is a fragmentary plan of a stacking tube.

Fig. 5 is an end elevation of a stock handling device.

In the form shown, the stamping machine comprises a base or table portion 1, a die plate 2, and a movable ram 3 upon which punches 4, 5, 6 and 7 are mounted. The ram 3 is raised and lowered by driving mechanism, not shown in the accompanying drawings and stock in the form of short strips 8 are fed to the stamping machine by feed rollers 9 which are also operatively connected with the driving mechanism. The strip of stock 8 extends between the die plate 2 and stripper plate 10 and passes between rollers 11 at the extreme left of the machine, as viewed in Fig. 1. The rollers 11 feed the blank from which stampings have been made to cutting members 12 which chop up the same into short lengths which are then conveyed into bins.

When the first stroke of the ram occurs, the punch 4 perforates the stock as shown at 13 in Fig. 2 and a subsequent stroke of the ram applies the punch 5 to that portion of the stock which was previously perforated by punch 4 thus combining the effects of punches 4 and 5, as shown at 15.

Upon the next stroke of the ram the portion of the stock bearing the combined impressions of punches 4 and 5 is moved under punch 6 which cuts out a disc or rotor lamination the size of the aperture 15 in Fig. 2 and the following stroke of the ram applies the punch 7 to the apertured portion of the stock, thereby cutting out a ring or stator lamination having outer and inner diameters equal to the diameters of the apertures 16 and 15 respectively shown in Fig. 2. The ram stamps out one rotor lamination and one stator segment at each stroke.

A welding device comprising a supporting table or base 17 and a movable welding element 18 is located at the right end of the stamping machine and is operatively connected to the ram 3 thereof by a lever 19, a chain 21 and a lever 22 pivoted on the guide frame of the ram. A ratchet wheel 23, carried by the ram, is actuated by a pawl 24 mounted on the guide frame 25 of the ram each time the ram completes a stroke. The ratchet wheel 23 is provided with a pin 26 extending outwardly therefrom. When the ratchet wheel is rotated to the position in Fig. 1, the pin registers with a block 27 on the lever 22 and rotates the latter downwardly. The left-hand end of the chain 21 is moved downwardly in unison with the lever 22 and the right-hand end thereof is moved upwardly, rotating the lever 19 in a clockwise direction and urging the slidably mounted welding element 18 downwardly. This action causes the points 28 of the welding device to engage the overlapped end portions of the first strip of stock 8 and a subsequent strip of stock 29, thereby rigidly securing the two strips together at spaced points 30 and 31, shown in Fig. 2.

A switch, comprising a stationary contact element 33 and a movable contact element 34, is operatively connected with the lever 19 and automatically closes an electric circuit, not shown in the drawings, which heats the welding points 28.

Stacking means 35 and 36, comprising arcuate-shaped tubular members having open ends, are mounted in the base 1 of the stamping machine for receiving the rotor and stator laminations respectively, as the latter are punched out of the stock by the dies 6 and 7. These stampings are passed rearwardly and upwardly through the tubes 35 and 36 as they accumulate therein and they may be removed from the rear end of the tubes.

A stock rack 37, comprising a rigidly mounted bench inclined forwardly, as shown in Figs. 1 and 5, is located at the extreme right of the welding device. The strips of stock may be conveniently placed upon the stock rack 37 by a pivotally mounted carrier 38 comprising a rack which may be loaded while in the full line position shown in Fig. 5 and rotated thereafter to the dotted line position, wherein the stock slides from the carrier 38 to the stationary rack 37.

When the machine is in operation, the first length of stock is fed by the rollers 9 to the stamping machine for receiving progressive stamping operations. The second strip of stock is placed upon the first strip in superimposed relation and is supported on a gauge member 39 comprising an end stop 40 against which the right-hand end of the strip 29 is positioned. The stop 40 may be so placed on the guide 39 as to position the left-hand end of the strip of stock 29 directly under the welding points 28.

As the stamping machine continues to operate, the first strip of stock 8 is moved to the left until the overlapped relation of the strips 8 and 29, shown in Fig. 1, occurs. When the strips are in this position the pin 26 is in registration with the block 27 and the following stroke of the ram brings the welding device into operation, thereby securing the strips together.

The above described, combined stamping and welding method permits the machine to be operated continuously without requiring frequent resetting of the stock and renders the employment of short lengths of stock practical. Only one attendant is required for each machine and his task merely consists in placing a strip of stock on the guide member 39, as above set forth, for the stampings produced are automatically stacked in the manner described.

Assorting and restacking of the stampings is unnecessary for, as they are punched out of the stock, they are stacked in their respective tubes with corresponding parts of like stampings in accurate registration and ready for use.

Although but one specific embodiment of this invention has been herein shown and described, it will be understood that details of the construction shown may be altered or omitted without departing from the spirit of this invention as defined by the following claims.

I claim:—

1. The combintaion with a stamping press, of means for feeding strips of stock thereto, means for fixing lengths of stock together, and mechanism operatively connecting said fixing means and said stamping press together for actuating said fixing means in timed relationship to facilitate continuous stamping operations.

2. The combination with a punch press, of means for feeding a strip of stock thereto, means for retaining another strip of stock in position to be fed to said punch press subsequently, welding means associated with said punch press, and means operatively connecting said punch press and said welding mechanism for actuating the latter to secure said strips of stock together when the first strip reaches a predetermined position relative to the second strip.

3. The combination with a stamping press, of means for welding lengths of stock together for facilitating continuous feeding of stock thereto, and means operatively connecting said stamping press and welding means for actuating the latter in timed relationship to secure said strips of stock together.

4. The combination with a stamping press comprising a ram, of feed rollers for feeding strips of stock thereto, welding mechanism associated with said stamping press for securing adjacent lengths of stock together, a lever pivotally mounted on said ram and operatively connected with said welding means, actuating means on said ram comprising a ratchet having a pin thereon, and a pawl on said press for rotating said ratchet wheel a predetermined amount for each stroke of said ram to periodically register said pin with said lever for actuating the latter and the welding means connected therewith.

5. In the manufacture of die stampings, the method of continuously feeding stock thereto, consisting of engaging a strip of stock between a pair of feed rollers, intermittently advancing said strip into position for receiving successive stamping operations, placing a second strip of stock over said first strip, and automatically fastening the end portions of said strips of stock together in timed relation with respect to the stamping operations.

6. The combination with a stamping press of means for welding lengths of stock together for permitting continuous feeding of stock thereto, operating mechanism connecting said stamping press and welding means for mechanically actuating the latter in timed relationship and an electric circuit for heating said welding means comprising a switch, said switch being operatively connected with said operating mechanism for simultaneously closing the circuit when said welding means is mechanically actuated.

Signed at Wausau this 10th day of December, 1928.

ROY O. GILBURG.